United States Patent [19]

Singleton

[11] Patent Number: 4,787,683
[45] Date of Patent: Nov. 29, 1988

[54] ELECTRO-PNEUMATIC BRAKING SYSTEM WITH DECELERATION CONTROL

[75] Inventor: William A. Singleton, Grafton, Ohio

[73] Assignee: Allied-Signal Inc., Morristown, N.J.

[21] Appl. No.: 95,276

[22] Filed: Sep. 11, 1987

[51] Int. Cl.$^4$ .............................................. B60T 8/64
[52] U.S. Cl. ...................................... 303/110; 303/108
[58] Field of Search ................... 303/15, 20, 100, 103, 303/106, 107, 108, 110, 111; 364/426

[56] References Cited

U.S. PATENT DOCUMENTS 3,998,496 12/1976 Bernabo et al. ...................... 303/106
4,327,414 4/1982 Klein ................................ 303/108 X Primary Examiner—Duane A. Reger
Attorney, Agent, or Firm—Ken C. Decker

[57] ABSTRACT

An electro-pneumatic vehicle braking system controls braking by electronic signals transmitted from a master controller to the brakes of the vehicle controlled by axle controllers. The master controller is responsive to the actuation of a treadle by the vehicle operator to calculate the difference between a requested vehicle deceleration and the actual vehicle deceleration, which is calculated based on data sensed by wheel sensors. Service braking pressure is then set to maintain the requested vehicle deceleration.

18 Claims, 6 Drawing Sheets

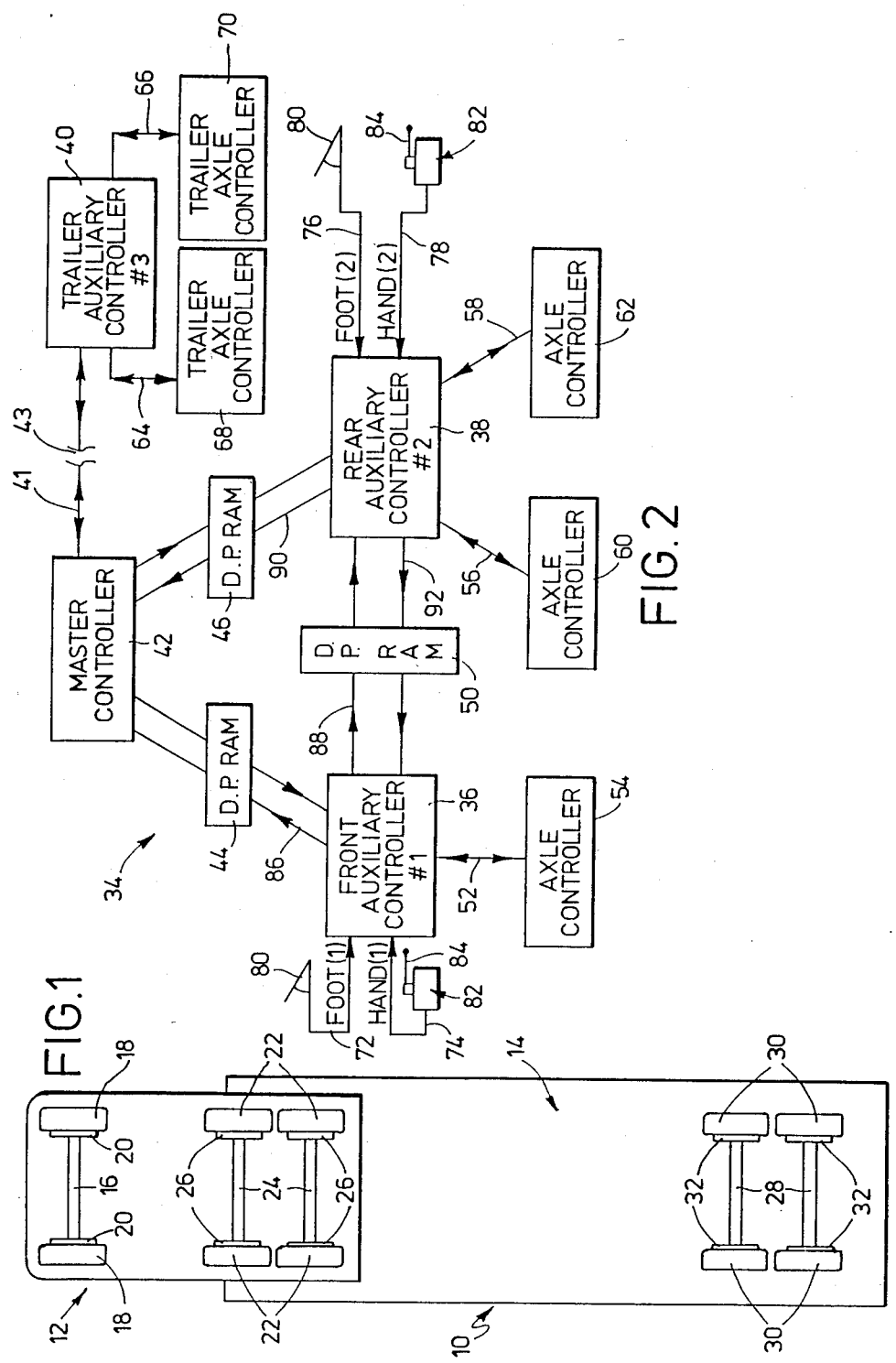

ELECTRO-PNEUMATIC BRAKING SYSTEM WITH DECELERATION CONTROL

This invention relates to a fluid pressure braking system in which the braking effort is controlled so that a substantially constant vehicle deceleration is achieved for a given input by the vehicle operator.

Existing heavy duty vehicles, such as heavy trucks and buses, are normally equipped with airbrake system which are actuated by compressed air. These systems are controlled by the vehicle operator by actuating a treadle which operates a dual brake valve. The dual brake valve communicates a pressure signal to relay valves which effect the brake actuation. Accordingly, this type of system is pressure controlled; that is, a given pressure level is communicated to the brakes of the vehicle in response to depression of the treadle. However, vehicles of this type carry widely varying loads. Obviously, a heavily loaded vehicle will take much longer to stop given a predetermined pressure level communicated to the vehicle's brakes than will a lightly loaded or unloaded vehicle. Accordingly, the vehicle operator must compensate for variations in load by actuating the treadle either a lesser or greater amount depending upon the load carried by the vehicle to achieve a given deceleration.

Inexperienced drivers find it difficult to achieve a wanted level of deceleration under widely varying vehicle loads. Even experienced drivers sometimes find it difficult to achieve a given rate of deceleration of the vehicle. Accordingly, it is desirable to eliminate braking sensitivity to vehicle load. Accordingly, with the system disclosed in the present application, the driver controls the vehicle deceleration with the foot treadle effectively eliminating the vehicle mass as a driver compensated variable.

The present invention provides vehicle deceleration control by observing the rotational speed of every wheel in the vehicle, selecting the highest speed wheel, calculating vehicle deceleration from the data generated by the highest speed wheel, and controlling braking as a function of the difference between the deceleration level requested by the vehicle operator and the actual vehicle deceleration. The permitted deviation between desired and actual vehicle deceleration is very small at low decelerations and increases proportionally to the requested deceleration. This permits better control at low deceleration while not overcontrolling at high deceleration requests.

Of course, there are certain situations, such as when a vehicle is operating at a low speed, or when all of the wheels of the vehicle are locked before the vehicle comes to a stop, or while the vehicle is descending a steep hill with the brakes applied and is still accelerating even though the brakes are applied, in which deceleration control is not possible. In these situations, control reverts to pressure control. The system provides a smooth transition between deceleration and pressure control in these situations.

Reference is made to copending U.S. application Ser. No. 37,497, filed Apr. 13, 1987, which discloses the basic electromatic braking system in which existing pneumatic controls are replaced with electronic controls. The present invention enhances the control provided with the electropneumatic system disclosed in the aforementioned application by providing deceleration control. Accordingly, references will be made to this prior application throughout the specification for details of the operation of some portions of the system disclosed herein. These details will not be described extensively in the present specification, since they have been disclosed in the aforementioned prior application.

These and other features of the present invention will become apparent from the following description with reference to the accompanying drawings, in which:

FIG. 1 is a diagrammatic illustration of the underside of a tractor-trailer combination vehicle of the type to be equipped with the fluid pressure braking system pursuant to the teachings of the present invention;

FIG. 2 is a diagrammatic illustration of the interrelationships between the various controllers used in the present invention;

Figure 3:
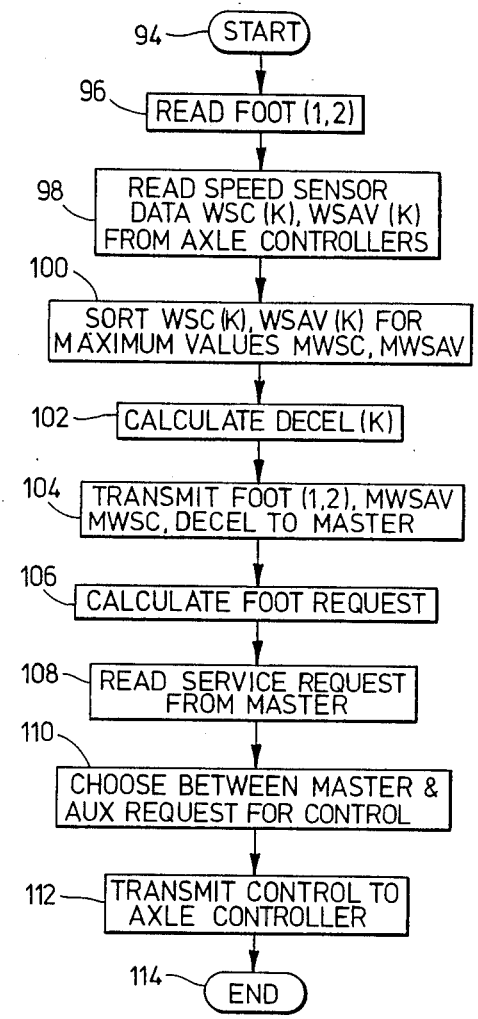
FIGS. 3 and 4 are detail block system diagrams of the auxiliary controllers used in the vehicle equipped with a braking system made pursuant to the teachings of the present invention.

Referring now to the drawings, the underside of a typical tractor-trailer articulated vehicle is indicated at 10 in FIG. 1. The vehicle 10 includes a tractor or towing portion generally indicated by the numeral 12 and a trailer or towed portion generally indicated by the numeral 14. The tractor 12 includes a front axle 16 upon which wheels 18 are rotatably mounted. Wheels 18 are controlled by fluid pressure actuated brakes 20. Rear wheels 22 of the tractor 12 are mounted on tandem rear axles 24 and are controlled by brakes 26. The trailer 14 is provided with tandem axles 28 which mount wheels 30. Wheels 30 are controlled by trailer brakes 32. As is conventional in the art, the brakes 20, 26, 32 are actuated by brake actuators (not shown), which are responsive to service braking pressure for effecting a service brake application. Actuators for brakes 26 and 32 are tandem actuators that also include a spring brake actuator which, in the absence of holdoff pressure, effects a spring powered actuation of the brakes. Reservoirs (not shown) are carried on both the tractor and the trailer and are charged by an automotive air compressor (not shown) which is operated by the vehicle engine on the tractor 12. Each of the wheels 18, 22, and 30 are provided with wheel speed sensors (not shown) which generate a wheel speed signal which varies as a function of the rotational speed of the corresponding wheel.

The control system for controlling the brakes 20, 26, and 32 electronically is generally indicated in FIG. 2 by the numeral 34. System 34 includes a front auxiliary controller 36 for the front axle 16 of the vehicle, a rear auxiliary controller 38 for the rear axles 24 of the tractor 12, and a trailer auxiliary controller 40 for the axles 28 of the trailer 14. The auxiliary controllers 36 and 38 each communicate with a master controller 42 through dual port random access memories ("RAM") 44 and 46. The trailer auxiliary controller 40 communicates with the master controller 42 through serial link 41 which extends between tractor 12 and trailer 14 through coupling 43. The controllers 36, 38 communicate with each other through a dual port RAM 50. Each of the controllers 36, 38, 40, and 42 includes a microprocessor programmed as will be hereinafter described. The front auxiliary controller 36 transmits a signal on output line 52 thereof indicating a desired brake pressure in the brakes on the front axle 16. This signal is transmitted to an axle controller 54, which includes electrically actuated valves and an appropriate electronic control for the electrically activated valves which are adapted, as is well known to those skilled in the art, to translate the signal transmitted on line 52 into a brake pressure level at the brakes 20. Similarly, the rear auxiliary controller 38 is adapted to generate similar signals on output lines 56, 58 thereof, which are similarly translated into a brake pressure level by axle controllers 60, 62, which are similar to controller 54 and which control brakes on the rear axles 24 of the tractor 12. The trailer auxiliary controller 40 also generates signals which are transmitted through output lines 64, 66 to corresponding axle controllers 68, 70, which are similar to controllers 54, 60, and 62 and which control fluid pressure level at the brakes 32 mounted on the axles 28 of the trailer 14. The signals transmitted from the speed sensors 31 are transmitted through a corresponding axle controller to one of the auxiliary controllers 36, 38, or 40.

Brake pressure command signals are transmitted to the front auxiliary controller 36 through input lines 72, 74 and to the rear auxiliary controller 38 through input lines 76, 78. The signals transmitted on lines 72 and 76 are generated by separate transducers responsive to movement of a single treadle member generally indicated by the numeral 80. Treadle member 80 may be similar to the one disclosed in U.S. Pat. No. 4,528,590, but modified to include a second movement-responsive transducer. Although there are two such treadle members 80 indicated schematically on the drawings for clarity, there is, in reality, only a single treadle member with two different transducers in order to generate independent signals that are transmitted through the lines 72, 76. The treadle 80 is mounted on the floor of the vehicle operator's compartment and is operated by the driver's foot in the same way a conventional brake pedal is operated.

The signals on lines 74, 78 are generated from separate transducers within a hand control actuating device generally indicated by the numeral 82. Again, while two different devices 82 are illustrated in FIG. 2 for illustrative purposes, in reality only a single device 82 would be mounted in the vehicle operator's compartment, where the handle 84 thereof can be reached by the vehicle operator. The device 82 includes separate transducers which convert the degree of angular movement of the lever 84 into an electrical signal. The output of each of the transducers included within the device 82 are transmitted over lines 74, 78 to the controllers 36, 38 respectively. The lever 84 is operated by the vehicle operator to control the brakes of the trailer 14 independently of the brakes on the tractor. Accordingly, a brake application of all of the vehicle's brakes can be effected by actuating the treadle 80 or a trailer brake application alone may be effected by operation of the lever 84. The signals generated on the lines 72, 74 are transmitted to the dual port RAMS 44, 50 through output lines 86, 88 respectively. Similarly, signals on input lines 76, 78 are communicated to the dual port RAMS 46, 50 through output lines 90, 92. Accordingly, the signals from both transducers on both of the devices 80 and 82 (a total of four separate signals) are made available to each of the controllers 36, 38 and 42.

Figure 4:
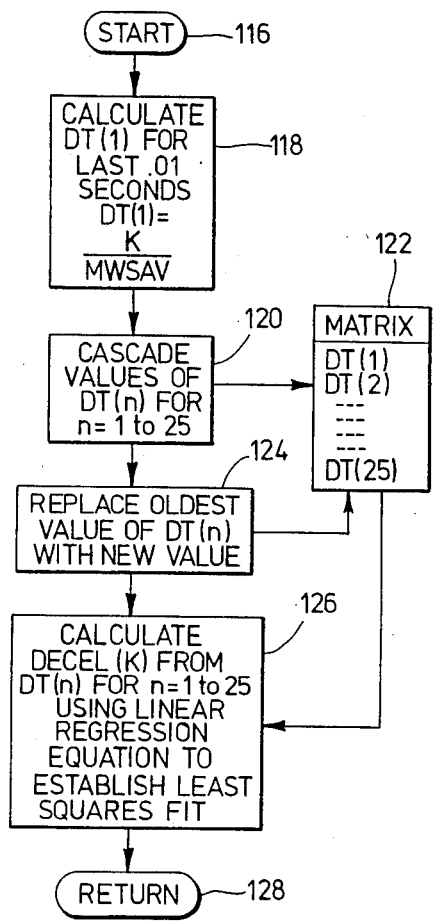

Referring now to FIGS. 3 and 4, the manner in which each of the auxiliary controllers processes the data transmitted to it will be described in detail. In the flow charts comprising FIGS. 3 and 4, a form of matrix notation has been used. The term AUX(1, 2) refers to either of the aforementioned auxiliary controllers 36 or 38. Values of the corresponding variables are similarly noted; for example, the variable FOOT (1, 2) refers to the input from either the first transducer on the foot control or the second transducer on the foot control. The terms WSC(K), WSAV(K) refer to the wheel speed inputs from the respective wheels controlled by the corresponding auxiliary controller.

Referring now to FIG. 3, the manner in which each of the auxiliary controllers process the data, transmitted to it will be described in detail. Since the manner in which the auxiliary controllers process the foot and hand control signals has been disclosed in detail in the above-identified application, this aspect of the operation of the auxiliary controller will not be described in detail herein. In FIG. 3, the program is started as indicated at 94 and the values generated by the treadle 80 for the foot control inputs (FOOT 1,2) are read as indicated at 96. The signals generated by the wheel speed sensors 31 are converted into a series of pulses by the auxiliary controllers, the frequency of which of course, is indicative of the wheel speed. These pulses are generated by a conventional wheel speed sensor which consists of an electromagnetic pickup placed adjacent to a toothed tone wheel which is mounted for rotation with the wheel. Since operation of this type of wheel sensors is well know to those skilled in the art, they will not be described in detail herein. However, the signals generated by the wheel speed sensors, per unit time, are identified by the variable WSC(K), and the mean time between pulses is indicated by the variable WSAV(K), the variable (K) being a number which refers to the particular wheel. The wheel speed signals are fed through the corresponding axle controller which controls the axle upon which the wheel is mounted to the corresponding auxiliary controllers. This data is read as indicated at 98 in FIG. 3.

The program described schematically in FIG. 3, as indicated at 100, then sorts the values of WSC and WSAV for the maximum values to find the wheel which is rotating more quickly that the others. The maximum value of WSC, or the pulse count, is identified by the variable MWSC, and the average time between pulses of the fastest rotating wheel is identified by the variable MWSAV. This data is used to calculate preliminary vehicle deceleration as indicated at 102, using the subroutine illustrated in FIG. 4 which will be described hereinafter.

The values from the foot inputs, the wheel speed data, and the calculated preliminary deceleration is then transmitted to the master controller as indicated by 104. As indicated in the prior application, a preliminary foot request is calculated at 106. Since the manner in which the foot request is calculated is identical to that described in the prior application, it will not be described hereinafter. The service request from the master controller is then read as indicated at 108. This service request is calculated as will be described hereinafter. The auxiliary controllers then choose between the requested service pressure from the master read at 108 and the calculated request at 106, as indicated at 110. This choice involves a failure analysis and is more fully disclosed in the prior application. Again, since the manner in which a choice is made between a master and auxiliary request is not critical to the present invention and is fully described in the prior application, it will not be disclosed herein. The requested brake pressure is then transmitted to the axle controller as indicated at 112, which effects a brake pressure in the brake actuators in response to the requested service pressure. The program then ends as indicated at 114. While the program indicated in FIG. 3 is that used by the auxiliary controls 36, 38 mounted on the tractor towing portion of the vehicle, the trailer auxiliary controller 40 operates in substantially the same way as that disclosed in the prior application, the only difference being that the trailer auxiliary controller calculates deceleration as indicated at 102 in the manner to be described with reference to FIG. 4.

The preliminary vehicle deceleration subroutine illustrated in FIG. 4 is started as at 116. As indicated at 118, the quantity DT(1) is calculated. The quantity DT(1) is the average velocity of the selected vehicle wheel for the last 0.01 second. This quantity is formed by using a constant K, which is calculated for the particular vehicle as a function of the rolling radius of the wheel and the number of teeth in the tone wheel forming part of the speed sensor which is rotatable with the wheel. The quantity DT(1) is formed by dividing constant K by the mean time between pulses (MWSAV) of the fastest wheel for the last 0.01 of a second. These values, as indicated at 120, are cascaded into a memory matrix 122, until a total of 25 values of DT(N) are stored in the matrix 122. Accordingly, values are stored in the matrix representing wheel velocity in 0.01 second intervals for a total of 25 such values, which represent wheel speed for the last quarter of a second. If the matrix is full, the oldest value is replaced, as indicated at 124, with a new value of DT(N). As indicated at 126, the estimated vehicle deceleration is calculated from the values stored in the matrix 122 for the last quarter of one second by using a conventional linear regression equation to establish a least squares fit of the values of the velocity stored in the matrix 122 plotted against time. Accordingly, a linear plot of velocity against time is achieved. Vehicle deceleration is calculated by calculating the slope of the line generated by the linear regression equation to establish the least squares fit. The program then returns as indicated at 128. As discussed hereinabove, the auxiliary transmits this preliminary value of vehicle deceleration based on the highest speed wheel controlled by the corresponding auxiliary controller to the master controller.

Figures 5, 6:
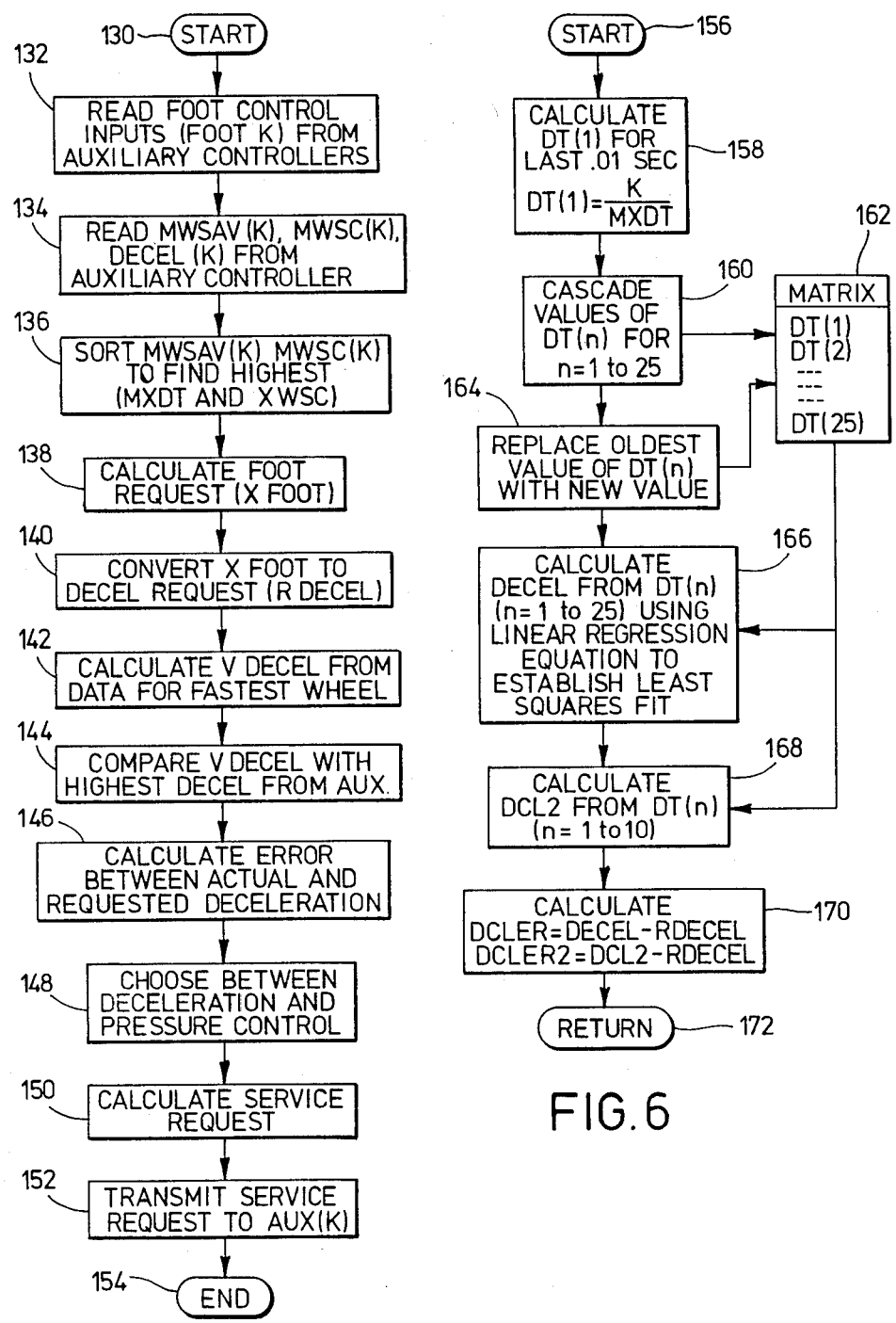
FIG. 5, FIG. 6, FIG. 7, FIG. 8, FIG. 9, FIG. 10, and FIG. 11 are detailed block system diagrams of the master controller illustrated in FIG. 2.

Referring to FIG. 5, the operation of the master controller 42 will be described in detail. The program start at 130 and the values of the foot control inputs are read from the auxiliary controllers as indicated at 132. The maximum wheel speed data and the values of the preliminary deceleration (DECEL (K)) are read from each auxiliary controller. The values of the wheel speed data which are read by the master controller are those for the wheel that is rotating the fastest controlled by each of the auxiliary controllers. Since the DECEL (K) transmitted from each of the auxiliary controllers is based only on the highest speed wheel controlled by that controller, DECEL (K) received from the various auxiliary controllers can vary widely. As indicated at 136, the values of the wheel speed data are sorted to find the maximum values. Accordingly, the variable MXDT represents the mean time between pulses generated by the fastest rotating wheel on the vehicle, since the microprocessor as indicated at 136 has sorted the values transmitted to the master controller by each of the auxiliary controllers. Similarly, the value of XWSC represents the highest number of pulses counted by any wheel on the vehicle.

The data read from the foot control valve at 132 is then used to calculate the foot request as indicated at 138. The foot request calculation is set forth in detail in the above-identified prior application and need not be discussed specifically herein, since it forms no part of the present invention. The foot request XFOOT is a percentage of the maximum possible deflection of the treadle 80. For example, XFOOT calls for a pressure level of zero PSI when the treadle is not depressed, and calls for a pressure level of 120 PSI when the treadle 80 is fully depressed. If the treadle is depressed half way, XFOOT calls for a pressure level of 60 PSI. Accordingly, the value of XFOOT is a pressure level which is representative of the total deflection of the treadle 80.

As indicated at 140, the value of XFOOT, which is representative of the percentage deflection of the treadle 80, is also used to calculate a requested vehicle deceleration. The maximum deceleration of the vehicle can be obtained either theoretically through well known calculations or by empirical data from the vehicle. When the treadle is released, RDECEL, the requested deceleration, is assumed to be 0; when the treadle is fully depressed, the requested deceleration RDECEL is assumed to be the maximum deceleration possible. Intermediate values are calculated proportionally; for example, if the treadle is depressed half way, RDECEL is assumed to be one-half the maximum possible deceleration of the vehicle.

Figure 10:
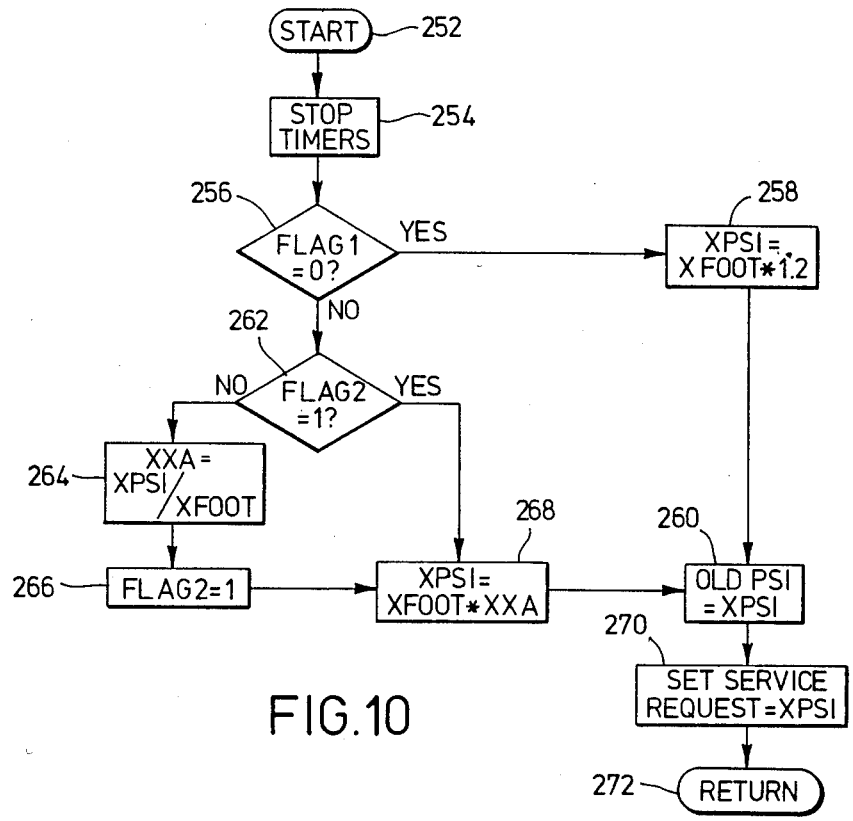

As indicated at 142, the vehicle deceleration VDECEL is calculated using the subroutine illustrated in FIG. 6 which will be described hereinafter. The calculated deceleration VDECEL is then compared, as indicated at 144, with the deceleration calculated by the auxiliary controllers set forth in the subroutine illustrated in FIG. 11. The error between the actual and requested deceleration, as indicated at 146, is also calculated by the subroutine illustrated in FIG. 6. A choice is then made, as indicated at 148, as to whether deceleration control should be used or the system should revert to pressure control. As will be discussed hereinafter with reference to FIG. 7, there are certain instances in which deceleration control cannot be used, and the system then automatically reverts to pressure control. As indicated at 150, the service request is then calculated. If deceleration control is used, the subroutine illustrated in FIG. 8 is used to calculate the requested service brake pressure. If pressure control is to be used, the subroutine in FIG. 10 is used to calculate the requested service brake pressure. After the service brake pressure is calculated, it is transmitted to the auxiliary controllers 36, 38, and 40 as indicated at 152. The service request is processed in the auxiliary controllers as described in the above-identified prior application to effect a brake application. The program then ends as indicated at 154.

Referring now to FIG. 6, the manner in which the vehicle deceleration, VDECEL, is described in detail. This calculation is similar to the calculation for the preliminary vehicle deceleration calculated in the auxiliary controllers and described hereinabove with reference to FIG. 4. Referring to FIG. 6, the subroutine is started as indicated at 156. As indicated at 158, the quantity DT(1), the velocity of the fastest moving wheel calculated over 0.01 second is calculated, and the values of 25 consecutive calculations of the quantity DT is calculated as indicated at 160. The constant K is calculated for each vehicle as described above. As discussed hereinabove with reference to FIG. 4, these 25 values of DT(N) are cascaded in matrix memory 162, and, if 25 values have already been stored in the matrix 162, the oldest value is replaced by the newest calculated value as indicated at 164. The 25 values in the matrix 162 are used to calculate, as indicated at 166, the quantity VDECEL by using the linear regression equation to establish at least squares fit as discussed hereinabove with reference to FIG. 4. The linear regression calculation returns the slope of a line fit to the velocity data (DT(n)) plotted against time. the slope of this line is measured to thereby form the quantity of velocity divided by time, or acceleration. As indicated at 168, the quantity DCL2 is calculated in the same way as the quantity VDECEL is calculated, except that the calculation for DCL2 uses only the last 10 data points cascaded in the memory matrix 162. Accordingly, the quantities VDECEL and DCL2 differ from one another only in that one is calculated over the past 0.25 second whereas the other is calculated using data accumulated over the last 0.1 of one second.

As indicated at 170, the deceleration "error", or the difference between the actual vehicle deceleration and the deceleration requested by the vehicle operator as calculated from the degree of actuation of the treadle 80 is calculated. The quantity DCLER is calculated to equal the difference between VDECEL and the requested deceleration, RDECEL. The quantity DCLER2 is calculated to equal the difference between DCL2 and the requested deceleration, RDECEL. Accordingly, the only difference in the deceleration errors DCLER and DCLER2 is that the former uses the vehicle deceleration as calculated from 25 data points while the latter uses vehicle deceleration calculated for the past 10 data points. As will be seen later with reference to FIG. 8, both of these quantities are used, and both are necessary to detect deceleration "spikes", that is, abrupt changes in deceleration, which are ignored in effecting deceleration control.

As discussed above, it is necessary to choose between control of the vehicle's brakes based on the requested vehicle deceleration or a requested pressure level. As also discussed above, the quantity XFOOT, the degree to which the treadle 80 is depressed by the vehicle operator is converted both to a requested pressure level and a requested deceleration level. Normally, it is desirable to control the vehicle based on the requested vehicle deceleration, since requested vehicle deceleration removes the mass of the vehicle as a factor that the vehicle operator must compensate for. Regardless of the load carried by the vehicle, a given depression of the treadle 80 will produce a given vehicle deceleration when deceleration control is used. The choice between pressure control or deceleration control, as set forth in block 148 of FIG. 5, is effected by the subroutine illustrated in FIG. 7. The subroutine is started at 174, and FLAG1 is set equal 0 at 176. At 178, the oldest data point, DT(1) is tested to see if it is less than 5.9 feet per second squared, indicating a velocity of about 4 miles per hour. If the velocity is less than this value, the program transfers to pressure control as indicated at 180. The pressure control subroutine is illustrated in FIG. 10 and will be described hereinafter. Transfer to pressure control is necessary at low velocities to assure that the vehicle stops properly because the wheel speed sensor data generated at low velocities is unreliable. If the vehicle velocity calculated at DT(1) is greater than 5.9 feet per second, the quantity XWSC, that is, the number of counts received from the fastest rotating wheel, is tested to determine if any such counts are being received as indicated at 182. If the quantity XWSC is less than 1, thereby indicating that no counts are being received from the fastest wheel (which may, for example, indicate that all the wheels of the vehicle are locked while the vehicle is skidding to a stop) transfer is made to pressure control as indicated at 180.

Figure 9:
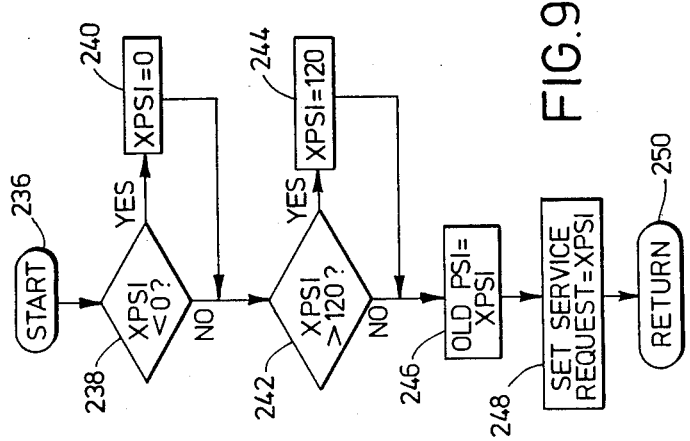

The values of DT(1) and DT(10) are then tested to see if the vehicle is either speeding up or slowing down during the last 0.10 second. Of course, when the brakes are applied, it is normally expected that the vehicle will decelerate. However, if, for example, the vehicle is descending a steep hill with the brakes lightly applied, the vehicle not only may not decelerate, but may actually increase in speed. If the vehicle is accelerating while the brakes are applied, deceleration control is obviously impossible, and the subroutine then branches to 186 where the FLAGS 1 and 2 are set, which will be used as hereinafter discussed. The quantity XFOOT is then tested to see if the vehicle operator continues to request braking pressure, as indicated at 188. If the vehicle operator is requesting a 0 pressure level, the program branches to the set service pressure subroutine (FIG. 9) as indicated at 190. If the requested service pressure is not equal to 0, the quantity XPSI is formed by multiplying the quantity XFOOT by a constant, as indicated at 192, whereupon the subroutine branches to a set service pressure subroutine as indicated at 190.

If the vehicle is decelerating as indicated at 184, a number of constants are set as indicated 192 before the program transfers to the deceleration control subroutine illustrated in FIG. 8 as indicated at 194. The quantity RQ is set equal to 2% of the value of XFOOT. The quantity RQ is a low end tolerance, which is set equal to 2% of the value of the pressure requested by the vehicle operator. The deceleration control subroutine illustrated in FIG. 8 assumes that no changes should be made to the pressure level if the change called for by the deceleration error is less than 2% of the value XFOOT called for by the vehicle operator. FLAG1 and FLAG2 are set as indicated, and the quantity XPSIG is set equal to a constant. The quantity XPSI is set equal to the vehicle operator foot request, XFOOT, multiplied by a constant. After transferring to deceleration control at 194, the program returns as indicated at 196. The program also returns after transferring the pressure control as indicated at 180 or after the set service subroutine is used at 190.

Referring now to FIG. 8, the manner in which deceleration control is effected will be described in detail. The subroutine illustrated in FIG. 7 branches to the subroutine illustrated in FIG. 8 at 194 in FIG. 7. The subroutine is started as indicated at 198. The absolute value of the quantity VDECEL, which is the calculated vehicle deceleration over the past quarter second calculated in the subroutine illustrated in FIG. 6, is tested to see if the absolute value of the quantity VDECEL is less than 0.1 foot per second squared, as tested at 200 in FIG. 8. If this quantity is less than 0.1 feet per second squared the program branches immediately to the test indicated at 202, but if the absolute value of VDECEL is greater than 0.1 feet per second squared, the program branches to 204, which sets XPSIG equal to XFOOT, the input which is a function of the depression of the treadle 80 by the vehicle operator, divided by the requested deceleration, RDECEL. The program then branches back to 202, which tests to determine if the absolute value of the deceleration error, DCLER, which was calculated at 170 in FIG. 6 and is the difference between the calculated vehicle deceleration and the deceleration requested by the vehicle operator, is less than the low end tolerance RQ, which was set equal to 0.02 times of the value of XFOOT at 192 in FIG. 7. If the value of DCLER is within the 2% tolerance, no change is necessary to the pressure level of the vehicle brakes, since the vehicle is already decelerating within the tolerance. Accordingly, the subroutine then returns as indicated at 204. However, if the quantity DCLER is greater than the tolerance, the program then tests, at 206, as whether the absolute value of DCLER2 is also greater than the tolerance RQ. It will be recalled that the quantity DCLER2 is the same as the quantity DCLER, except that the quantity DCLER2 is calculated using the vehicle deceleration calculated over the shorter time period of 0.1 seconds while the deceleration error DCLER is calculated using a vehicle deceleration calculator over the full 0.25 seconds. If DCLER2 is less than the tolerance, the subroutine returns as indicated at 204. If the absolute value of DCLER2 is greater than the tolerance, the program then tests at 208 as to whether the timer set when the last change in pressure was made is greater than or less than one-tenth of a second. If the time period since the last pressure change is greater than 0.1 seconds, the program branches to 210, which proceeds with pressure modification due to the error between the requested and actual vehicle decelerations. However, if a change in braking pressure was made within the last 0.1 seconds, the program then tests, at 212, to determine whether the deceleration error DCLER2 is less than five times the low end tolerance RQ, thereby indicating that a gross change in deceleration request has occurred within the last one-tenth second and should be compensated for. If such a gross change has occurred, the program branches to 210; if not, the program returns as indicated at 204.

Decision block 210 tests the deceleration error as to whether it is greater than or less than 0, thereby indicating whether the braking pressure should be increased or decreased. If the quantity DCLER is negative, the vehicle operator is requesting a deceleration greater than the current vehicle deceleration, and braking pressure must be increased. Accordingly, the program branches to 212, which tests the HIGH or LOW FLAG, which is set as will be hereinafter described. If the HIGH or LOW FLAG test is LOW, a condition in which pressure was increased on the last cycle of the program is indicated. A further increase of braking pressure is not desirable unless a time period greater than 0.02 seconds has elapsed since the last decrease in braking pressure, which is tested for at 214. If less than 0.02 seconds has expired since the last decrease in change in braking pressure, no change in braking pressure is made and the program returns as indicated at 204. If more than 0.02 seconds has expired since the last decrease in pressure, or if pressure was decreased during the last cycle through the program, a test is made to determine if the quantity DCLER2 is greater than DCLER at 216.

If DCLER2, which is the deceleration error based on the vehicle deceleration calculated over the shorter time period is greater than DCLER, the deceleration error based on the vehicle deceleration over the longer time period, a deceleration spike may be occurring which should be ignored. Accordingly, no pressure change is made in this situation, and the program returns as indicated at 204. However, if the test at block 216 is negative, the program proceeds to 218, where the pressure change is made. A correction factor, ZXPSI is calculated equal to XPSIG (which was set at 204) times the deceleration error times DCLER times the quantity ($-1$). Since XPSIG is set for values of vehicle deceleration greater than 0.1 in box 204 as being equal to the requested service pressure XFOOT divided by the requested deceleration RDECEL, the quantity ZXPSI is equal to the service request XFOOT times the deceleration error divided by the requested deceleration, RDECEL. The requested service pressure XPSI, is set equal to OLDPSI, which is the value of XPSI calculated on the preceding cycle through the program, minus the correction factor ZXPSI. The timers are then reset and started, and the HIGH or LOW FLAG is set equal to LOW. The program then branches, as indicated at 220, to the set service pressure subroutine illustrated in FIG. 9 which will be described hereinafter. The program then returns as indicated at 204.

If the deceleration error DCLER as tested at 210 is positive, a situation in which the vehicle is decelerating faster than the requested deceleration is indicated. Accordingly, the braking pressure must be decreased. The HIGH or LOW FLAG is tested at 222 to determine if pressure was increased or decreased on the last cycle of the program. If braking pressure was decreased, a further decrease of pressure is not desirable unless a time period greater than 0.05 seconds has elapsed as tested at 224. If less than 0.05 seconds has elapsed, the program returns as indicated at 204, but otherwise the program proceeds to 226, where ZXPSI and XPSI are calculated in the same manner that there were calculated in block 218. The timers are then reset and started and the HIGH or LOW FLAG is set equal to HIGH. The program then tests at 228, as to whether XPSI is less than XFOOT. If XPSI is less than XFOOT, XPSI is set equal to XFOOT as indicated at 230 before proceeding to the set service pressure subroutine as indicated at 232. The program then returns as indicated at 204.

Figure 7:
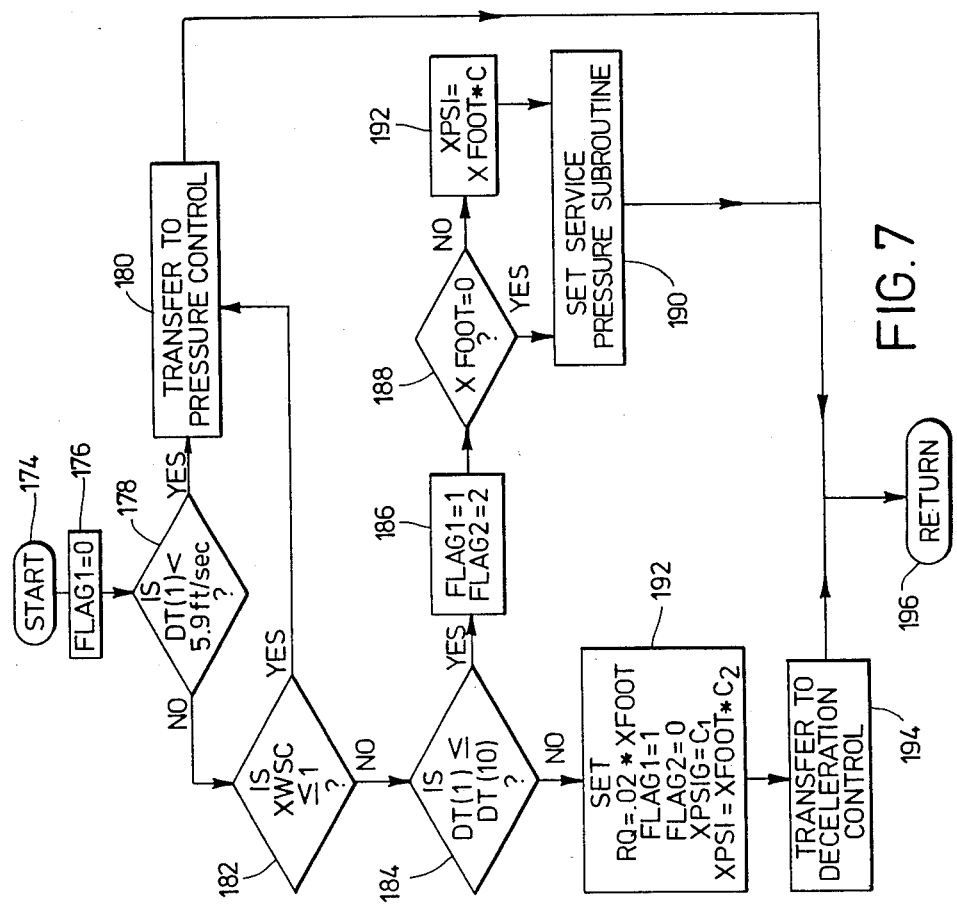
Figure 8:
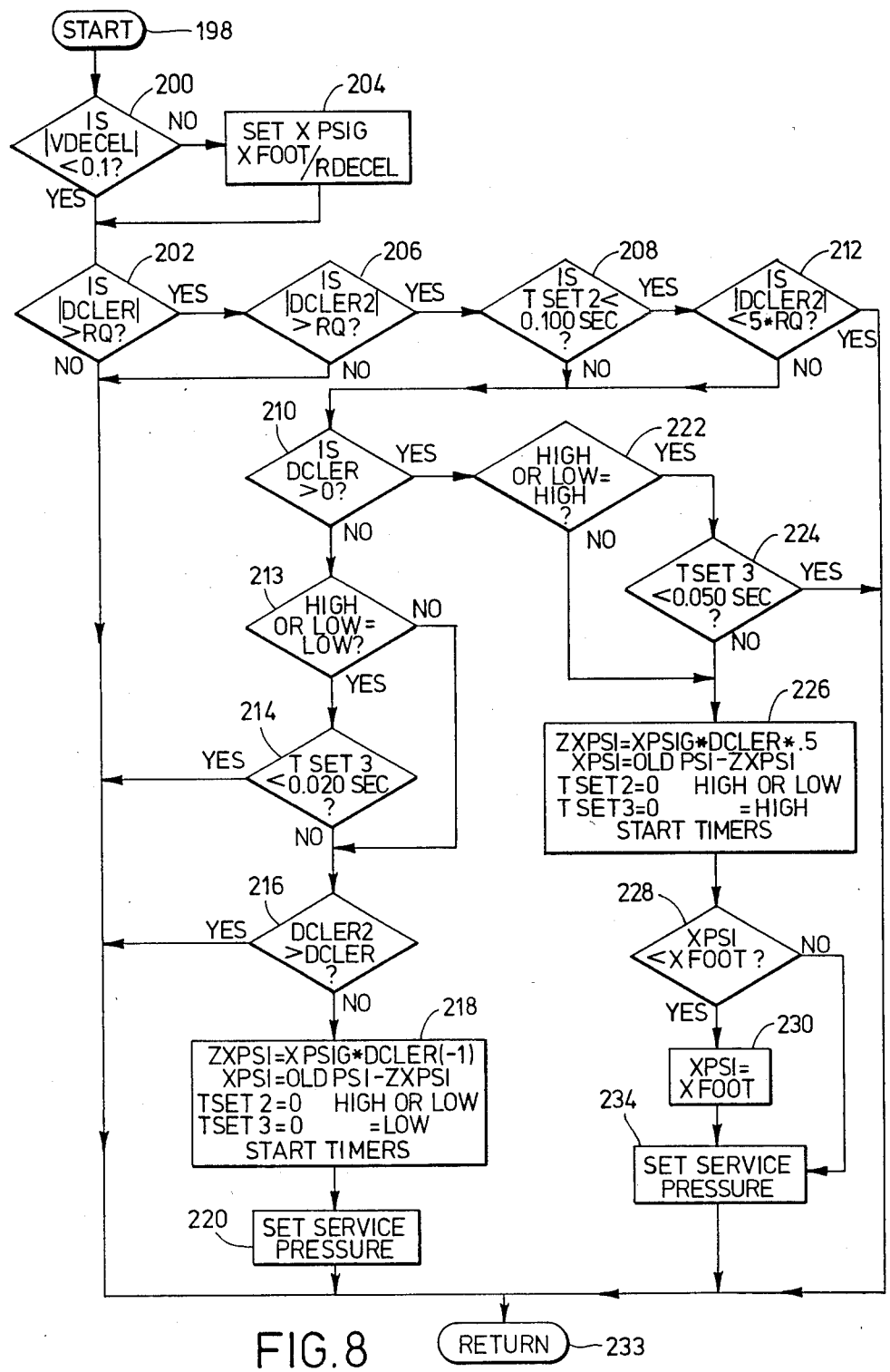

Since the requested service pressure XPSI calculated in FIGS. 7 and 8 may be less than 0 or greater than 120, the minimum and maximum limits on service pressure, it is desirable to assure that if the requested service pressure XPSI is less than 0 that it is set equal to 0, and that if XPSI is greater than 120, that it is set as equal to 120. Accordingly, referring now to FIG. 9, the set service pressure subroutine is started as indicated at 236 and at tests at 238 as to whether the variable XPSI is less than 0. If it is less than 0, the variable XPSI is set equal to 0 at 240; otherwise, the variable XPSI is tested at 242 to determine if it is greater than 120. If the variable XPSI is greater than 120 it is set equal to 120 at 244; otherwise the subroutine proceeds to 246, where the variable OLDPSI is set equal to XPSI. Accordingly, the value of XPSI calculated on this cycle is stored in memory to be used in calculations of XPSI during the next cycle through the program. The service request is then set equal to XPSI as indicated at 248 and the program returns as indicated at 250. The service request is, of course, transmitted to the auxiliary controllers as indicated at 152 on FIG. 5 and is read by the auxiliary controllers as indicated at 108 in FIG. 3. This service request would then normally be tested for error in the auxiliary controllers and is then transmitted to the axle controllers to be used in setting the braking pressure.

As discussed hereinabove with reference to FIG. 7, under certain conditions it may be necessary to transfer to pressure control as indicated at 180 in FIG. 7 instead of preceding with control of the braking pressure based on deceleration. The pressure control subroutine is illustrated in FIG. 10, and is started as indicated at 252. As indicated at 254, the timers TSET2, TSET3 are stopped and reset to 0. FLAG1 is then tested as indicated at 256. As indicated in FIG. 7, FLAG1 is set equal to 1 at 192 when the decision is made to transfer to deceleration control. Accordingly, if FLAG1 is equal to 0, the program has already been in pressure control. Accordingly, the value of the service request, XPSI, is set equal to XFOOT times 1.2 as indicated at 258, and the value of OLDPSI is set equal to XPSI as indicated at 260. As discussed above, the value OLDPSI is the value of XPSI on the present cycle through the program which is stored in memory for use in calculations of braking pressure on subsequent cycles. If FLAG1 is not equal to 0, a condition is indicated in which the control is in transition from deceleration control to pressure control. Since the value of the service request XPSI may be substantially different than the value of XPSI calculated during deceleration control, it is necessary to calculate a transition smoothing factor which smooths transition in the braking pressure during the transition between deceleration control and pressure control. Accordingly, FLAG2 is tested at 262 to determine if it is equal to 1 or not. If FLAG2 is not equal to 1, which indicates that the smoothing factor has not been calculated in a previous cycle, the smoothing factor XXA is calculated, as indicated at 264, as being equal to the quantity XPSI divided by XFOOT. FLAG2 is then set equal to 1 as indicated at 266, so that on succeeding cycles through the program the smoothing factor will not be recalculated as long as the program remains in pressure control. The value of XPSI is then set equal to the quantity XFOOT times the smoothing factor XXA as indicated at 268. The program then proceeds to 260 where the quantity OLDPSI is set equal to XPSI as described above, and the service request is set equal to XPSI as indicated at 270 before the program returns as indicated at 272. Again, the service request XPSI is transmitted to the auxiliary controllers and subsequently to the axle controllers for effecting a brake pressure level in the brake pressure chambers.

Figure 11:
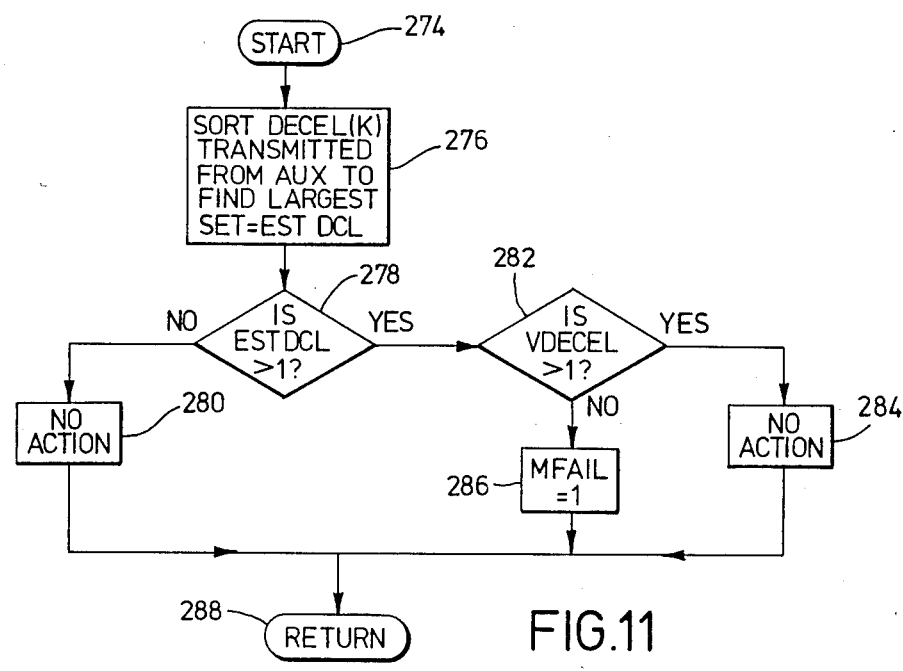

Referring now to FIG. 11, it will be recalled that a preliminary vehicle deceleration was calculated by each of the auxiliary controllers based upon the speed of the fastest rotating wheel controlled by the corresponding auxiliary controller. Since the master controller calculates vehicle deceleration based upon the fastest moving wheel on the entire vehicle, the vehicle deceleration calculated by the master controller may differ significantly from that calculated by the auxiliary controllers. However, under certain circumstances a disparity between the vehicle deceleration calculated at the master controller and that calculated in the auxiliary controllers may indicated a failed situation. Referring to FIG. 11, the subroutine is started as indicated at 274, and the values of DECEL(K) transmitted from each of the auxiliary controllers is sorted to determine the largest value of DECEL(K) calculated by each of the auxiliary controllers as indicated at 276. The highest value of DECEL(K) is set equal to ESTDCL. The value of ESTDCL is tested to determine if it is larger than 1 at block 278, if the value of ESTDCL is less than 1, no action is taken as indicated at 280. However, if the value of ESTDCL is greater than 1, indicating an acceleration, the value of VDECEL, the vehicle deceleration calculated by the master controller as tested to determine if it is greater than 1 as indicated at 282. If the value of DECEL is also greater than 1, no action is taken as indicated at 284, since it is indicated that both the vehicle deceleration calculated by the master controller and the vehicle deceleration based on the highest calculation of vehicle deceleration calculated by the auxiliary controllers are both greater than 1. However, the value of the vehicle deceleration is not greater than 1, a failure FLAG is set as indicated at 286. This is indicative of a condition where the vehicle deceleration calculated in the auxiliary controlling the fastest rotating wheel is greater than 1, but the vehicle deceleration calculated at the master control is less than 1. This may be a temporary situation, but it is inconsistent with the fact that the vehicle deceleration calculated by the master controller is based on the fastest rotating wheel of the entire vehicle, and should be about the same as the quantity ESTDCL, since this is the value calculated by the auxiliary controller controlling the fastest moving rotating wheel. The program then returns as indicated at 288. No action is taken as a result of MFAIL=1, but the FLAG is stored in memory for use when the vehicle is serviced.

I claim:

1. Fluid pressure braking system for a vehicle having wheels and brakes controlling said wheels comprising wheel speed sensing means for generating a wheel speed signal which varies as a function of the rotational speed of a vehicle wheel, means responsive to said speed signal for generating a vehicle deceleration signal as a function of said wheel speed signal representing calculated deceleration of said vehicle, operator responsive means for generating an output signal, means responsive to said output signal for generating a deceleration request signal representing a requested vehicle deceleration desired by the vehicle operator, means for generating a difference signal as a function of the difference between said vehicle deceleration signal and said deceleration request signal, and means for controlling braking pressure communicated to said brakes as a function of said difference signal.

2. Fluid pressure braking system as claimed in claim 1, wherein said operator responsive means is actuable between fully released and fully applied positions, means for generating said output signal, said output signal varying as a function of the position of the operator responsive means between said released and applied positions.

3. Fluid pressure braking system as claimed in claim 1, and means for generating a pressure request signal as a function of said output signal, said braking pressure controlling means including means responsive to predetermined vehicle conditions for modifying said pressure request signal as a function of said difference signal.

4. Fluid pressure braking system as claimed in claim 1, and means responsive to said output signal for generating a pressure request signal, said brake pressure controlling means including means responsive to predetermined vehicle conditions for controlling communication of braking pressure to said brakes solely as a function of said pressure request signal and ignoring said difference signal.

5. Fluid pressure braking system as claimed in claim 4, wherein said means responsive to predetermined vehicle conditions includes first condition responsive means for sensing when the velocity of the vehicle drops below a predetermined level and switching means for switching control of said braking pressure from a requested deceleration level to a requested service braking pressure level when the velocity of the vehicle drops below a predetermined level.

6. Fluid pressure braking system as claimed in claim 4, wherein said means responsive to predetermined vehicle conditions includes second sensing means responsive to a vehicle accelerating condition during braking for switching control of said braking pressure from a requested deceleration level to a requested service braking pressure level when said accelerating condition during braking occurs.

7. Fluid pressure braking system as claimed in claim 4, wherein said means responsive to predetermined vehicle conditions is responsive to the absence of wheel speed signal to thereupon shift to controlling said braking pressure solely as a function of the pressure request signal.

8. Fluid pressure braking system as claimed in claim 1, wherein said wheel speed sensing means includes means for generating signals based on the speed of more than one of said vehicle wheels, and means for sorting said last mentioned signals to pick the signal representing the vehicle wheel which is rotating at the highest velocity as a selected speed signal for generating said vehicle deceleration signal as a function of said selected speed signal.

9. Fluid pressure braking system as claimed in claim 8, wherein said vehicle deceleration signal generating means includes means responsive to said selected signal for generating a succession of data points representing values of the vehicle wheel velocity represented by said selected signal over a relatively short time period, means for memorizing an array of successive data points, said means for generating said vehicle deceleration signal generating said vehicle deceleration signal as a function of said data points.

10. Fluid pressure braking system as claimed in claim 9, wherein said vehicle deceleration signal generating means includes means for generating a first vehicle deceleration signal based on a greater quantity of said data points and a second vehicle deceleration signal based on a lesser quantity of said data points.

11. Fluid pressure braking system as claimed in claim 1, and means for establishing a tolerance signal based on a predetermined percentage of said deceleration request signal, means for generating a signal representing the difference between the deceleration request signal and said vehicle deceleration signals, and means for varying said pressure request signal if said difference is greater than said tolerance.

12. Fluid pressure braking system as claimed in claim 11, wherein said braking pressure controlling means includes timing means for inhibiting change of the braking pressure due to changes in the value of difference signal occurring within predetermined time periods of prior changes in said difference signal.

13. Fluid pressure braking system as claimed in claim 12, wherein said braking pressure controlling means is responsive to whether the braking pressure was increased or decreased in preceding control cycles to prevent change in the opposite direction the braking pressure was changed in the last cycle within a predetermined time period of such prior change.

14. Fluid pressure braking system as claimed in claim 10, wherein said braking pressure controlling means is responsive to the second deceleration signal exceeding the first deceleration signal to inhibit change in the braking pressure.

15. Fluid pressure braking system as claimed in claim 4, wherein said controlling means includes means for smoothing the transition between control based upon said difference signal and control based upon the pressure signal alone.

16. Fluid pressure braking system for a vehicle having wheels and brakes controlling said wheels comprising wheel speed sensing means for generating a wheel speed signal which varies the function of the rotational speed of a vehicle wheel, means responsive to said speed signal for generating a vehicle deceleration signal as a function of said wheel speed signal representing calculated deceleration of said vehicle, operator responsive means for generating an output signal, pressure request generating means responsive to said output signal for generating a pressure request signal, deceleration request signal generating means responsive to said output signal for generating a deceleration request signal representing a requested vehicle deceleration desired by the vehicle operator, means for generating a difference signal as a function of the difference between said vehicle deceleration signal and said deceleration request signal, and means for controlling braking pressure communicated to said brakes as a function of either said pressure request signal or said difference signal, said controlling means including mode switching means responsive to predetermined vehicle conditions from switching from a first mode in which the brakes of the vehicle are controlled by a signal which is a function of said difference signal to a second mode in which the brakes of the vehicle are controlled solely as a function of said pressure request signal.

17. Fluid pressure braking system as claimed in claim 16, wherein said mode control means is responsive to said wheel speed signal for switching to the said second mode when the value of the wheel speed sensor is below a predetermined value.

18. Fluid pressure braking system as claimed in claim 17, wherein said wheel speed sensing means includes means for sorting the speed signals generated representing each wheel of the vehicle to select the highest speed wheel, said highest signal being said wheel signal to which said vehicle deceleration signal generating means responds to generate said vehicle deceleration signal.

* * * * *